United States Patent
Wu et al.

(10) Patent No.: US 8,705,379 B2
(45) Date of Patent: Apr. 22, 2014

(54) MULTIPOINT RELAY SET SELECTION METHODS AND THEIR APPLICATION TO MULTICAST CHANNEL RESERVATION IN OVERLAPPING BASIC SERVICE SETS IN WIRELESS NETWORKS

(75) Inventors: Mingquan Wu, Princeton Junction, NJ (US); Hang Liu, Yardley, PA (US); Ishan Mandrekar, Monmouth Junction, NJ (US); Ramkumar Perumanam, Edison, NJ (US); Saurabh Mathur, Monmouth Junction, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 359 days.

(21) Appl. No.: 13/319,342

(22) PCT Filed: May 21, 2009

(86) PCT No.: PCT/US2009/003149
§ 371 (c)(1),
(2), (4) Date: Nov. 8, 2011

(87) PCT Pub. No.: WO2010/134896
PCT Pub. Date: Nov. 25, 2010

(65) Prior Publication Data
US 2012/0057515 A1    Mar. 8, 2012

(51) Int. Cl.
*H04L 12/28* (2006.01)
(52) U.S. Cl.
USPC .......................... 370/248; 370/252; 370/390
(58) Field of Classification Search
CPC ..... H04L 45/02; H04L 45/122; H04L 45/127; H04L 45/26
USPC ......... 370/230–231, 235–236, 248, 252, 389, 370/390, 408, 448, 457
See application file for complete search history.

(56) References Cited

U.S. PATENT DOCUMENTS

| | | | |
|---|---|---|---|
| 2006/0109859 A1* | 5/2006 | Acharya et al. | 370/445 |
| 2006/0256741 A1* | 11/2006 | Nozaki | 370/278 |
| 2008/0056196 A1* | 3/2008 | Ito et al. | 370/331 |

OTHER PUBLICATIONS

M. Baysan etal: "A Polynomial Time Soultion to Minimum Forwarding Set Problem in Wirless Networks under Disk Coverage Model" Pre-Print version, Aug. 25, 2006, pp. 1-12.
Ou Liang etal: "A survey of multipoint relay based broadcast schemes in wireless ad hoc networks" IEEE, vol. 8, No. 4, Oct. 1, 2006, pp. 30-46.
G. Calinescu etal: "Selecting forwarding neighbors in wireless ad hoc networks" Mobile Networks . . . , vol. 9, No. 2, 2004, pp. 101-111.
S. Dhap etal: "An energy-efficient heterogeneous dual routing scheme for mobile ad hoc and sensor networks" Int'l Journal of Mobile, vol. 2, No. 2, 2007 pp. 105-115.

(Continued)

*Primary Examiner* — Redentor Pasia
(74) *Attorney, Agent, or Firm* — Robert D. Shedd; Jeffrey M. Navon; Catherine A. Cooper

(57) ABSTRACT

A method and apparatus are described including communicating with neighbor nodes in a wireless network, determining one-hop neighbor nodes and two-hop neighbor nodes responsive to the communication, determining a minimum multipoint relay set responsive to the first working channel determination and communicating over the wireless network using the minimum multipoint relay set.

8 Claims, 5 Drawing Sheets

(56) References Cited

OTHER PUBLICATIONS

Ju Wang etal: "Performance Study of a Multicast Protocol for Wireless Sensor Networks based on N2 Connectivity", Computer Arch. Sep. 1, 2007, pp. 148-153.

M. Baysan etal: "A Polynomial Time Solution to Minimum Forwarding Set Problem in Wireless Networks . . . Model" published version, vol. PP, No. 7. Jul. 1, 2009, pp. 913-924.
Search Report Dated Jan. 29, 2010.

\* cited by examiner

MULTIPOINT RELAY SET SELECTION METHODS AND THEIR APPLICATION TO MULTICAST CHANNEL RESERVATION IN OVERLAPPING BASIC SERVICE SETS IN WIRELESS NETWORKS

This application claims the benefit, under 35 U.S.C. §365 of International Application PCT/US2009/003149, filed May 21, 2009, which was published in accordance with PCT Article 21(2) on Nov. 25, 2010 in English.

FIELD OF THE INVENTION

The present invention relates, in general, to wireless networks and, in particular, to optimized and heuristic methods for minimum multipoint relay (MPR) set selection as well as multicast channel reservations based on the selected MPR set for overlapping basic service sets (OBSSs) in wireless networks.

BACKGROUND OF THE INVENTION

In multicast/broadcast applications, data are transmitted from a server to multiple receivers over wired and/or wireless networks. Herein, a "/" is used to indicate alternative names for the same or similar components. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

Some concepts/terms that may benefit the understanding of the present invention are provided. A frame is a unit of data. That is, data can be packaged in packets or frames or any other convenient format. As used herein a frame is used to indicate data packaged in a format for transmission.

The minimum multipoint relay set problem has been proved to be NP complete, which means there are no polynomial methods to solve the problem. In one prior art article a heuristic algorithm was proposed to solve the MPR problem. In this heuristic algorithm, first those one hop neighbors that are the only neighbor of some two hop neighbor nodes are added to the MPR set. The heuristic algorithm then finds the one hop neighbor node that covers the maximum uncovered two hop neighbor nodes and adds this node to the MPR set. This continues until all the two hop neighbor nodes are covered. Recently, the concept of MPR has also been introduced in a reactive Mobile Ad Hoc Network (MANET) routing protocol and a new IETF draft for message flooding in MANET networks.

It should be noted that in wireless networks, the number of one-hop and two-hop neighbor nodes of a node often is not very big. In this case, it is still viable to find the minimum MPR set using an optimized approach.

The present invention solves these and other problems by describing both an optimized and a heuristic method to perform minimum MPR set selection. Multicast channel reservation in WLAN is also a challenging problem, especially in OBSSs. In earlier applications PCT/US08/008162 filed Jun. 30, 2008, Applicants described using bit-mapped Request-to-Send/Clear-to-Send (RTS/CTS) signaling for multicast channel reservation in OBSSs in wireless networks. The present invention uses the selected minimum MPR set to improve the scalability in OBSSs in wireless networks including wireless local area networks (WLANs).

SUMMARY OF THE INVENTION

The concept of multipoint relay (MPR) has widespread use in multicast routing and data broadcast/multicast in multihop wireless networks. In multihop wireless networks, there are many cases when data has to be delivered to every node in the wireless network, such as when a node sends a service or routing discovery request. In order to reduce the duplicate data packets/frame/messages that are transmitted, each node selects a subset of nodes from among its neighbors. The node then sends the data to the identified subset of neighboring nodes, which, in turn, retransmit the multicast packets. This subset of neighboring nodes is called multiple relay (MPR) set. In order to reduce multicast/broadcast overhead, it is desirable that the number of nodes included in the MPR set be the minimum number of nodes with the constraint that a node can reach all of its two-hop neighbors through a node in MPR set. Optimum minimum MPR set selection, however, is a NP complete problem. Existing heuristic algorithms do not perform well under certain scenarios/circumstances/conditions.

A method and apparatus are described including communicating with neighbor nodes in a wireless network, determining one-hop neighbor nodes and two-hop neighbor nodes responsive to the communication, determining a minimum multipoint relay set responsive to the first determination and communicating over the wireless network using the minimum multipoint relay set.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
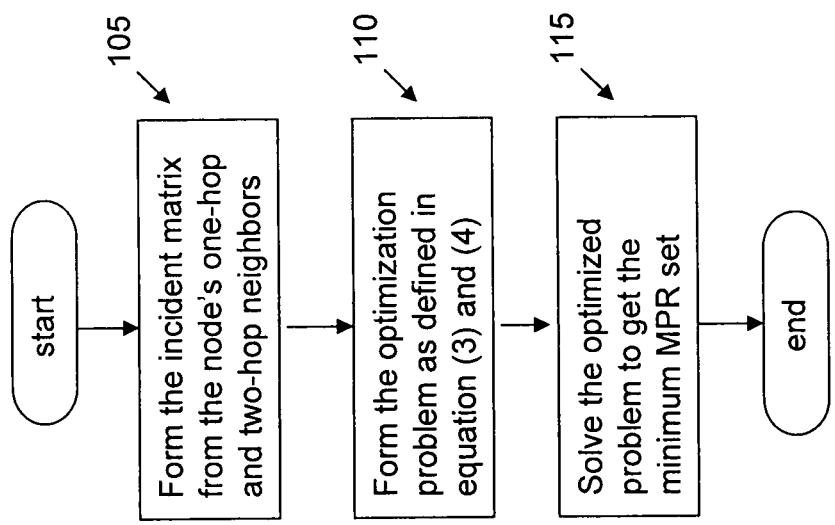
FIG. 1 is a flowchart for the optimized minimum MPR selection method.

The use of a multipoint relay (MPR) set has widespread use in routing protocols and data broadcast/multicast in multihop wireless networks, which include multihop wireless ad hoc and/or mesh networks. An MPR set can also be used to communicate control messages in overlapped base service systems (OBSSs) in wireless area networks. Suppose there is a need to find a MPR set for node x in a wireless network, represented as MPR(x). As used herein, nodes include wireless base stations, wireless access points, mesh routers, mobile terminals and mobile devices. Such devices can be, but are not limited to, computers, laptops, personal digital assistants (PDAs), set top boxes, dual mode smart phones and the like. Let $N1(x)$ and $N2(x)$ be the set of one-hop neighbors (neighbor nodes) and two-hop neighbors of node x respectively. Here a one-hop neighbor node of node x is defined as a node in a wireless network that can communicate directly to node x through a wireless channel. A two-hop neighbor node of node x is defined as a node in a wireless network that is not node x's one-hop neighbor or node x itself but can communicate with node x's one-hop neighbor directly (only one hop away from node x's one hop neighbors) through a wireless channel. A node can obtain its one-hop neighbor and two-hop neighbor information by exchanging messages with its one-hop neighbors. For an example, node x's one-hop neighbor can report itself and its neighbors to node x. After node x received all the reports from it's one-hop neighbors, node x would know all its one-hop and two-hop neighbors. In a mobile network where nodes move constantly, neighbor information can be updated through periodic message exchanges between neighbors. Let $i \in N1(x)$ be node x's one-hop neighbors, $j \in N2(x)$ be node x's two-hop neighbors and let n1 and n2 be the number of node x's one-hop neighbors and two-hop neighbors respectively. A n1×n2 matrix A is formed, where:

$$A_{ij} = \begin{cases} 1 & i \text{ and } j \text{ are neighbors} \\ 0 & \text{otherwise} \end{cases} \quad (1)$$

Let $c_i$ be an indicator such that:

$$c_i = \begin{cases} 1 & i \in MPR(x) \\ 0 & i \notin MPR(x) \end{cases} \quad (2)$$

The following optimization problem is formed to solve the minimum MPR set problem:
Minimize:

$$\sum_{i=1}^{n1} c_i \quad (3)$$

Subject to:

$$\sum_{i=1}^{n1} c_i A_{ij} \geq 1 \quad (4)$$

$$\forall \, j \in N2(x)$$

FIG. 1 is a flowchart for the above optimized minimum MPR selection method. At 105, the n1×n2 matrix A (incident matrix) is formed from the node's one-hop and two-hop neighbors. At 110 the optimization problem as defined by equations (3) and (4) is formed using the incident matrix. At 115 the optimization problem is solved to obtain the minimum MPR set. The MPR set can then be used for multicast channel reservations in wireless networks.

When the number of node x's one-hop neighbors and two-hop neighbors becomes large, however, it becomes impractical to solve the optimized problem defined above. In this case, a heuristic MPR selection method is proposed and described. The following steps describe the heuristic algorithm:

1. Form a bipartite graph using nodes in $N1(x)$ and $N2(x)$. There is an edge between a node in $N1(x)$ and a node in $N2(x)$ if these two nodes are neighbors. There are no edges between any two nodes in $N1(x)$ or any two nodes in $N2(x)$. A bipartite graph (or bigraph) is a graph whose vertices can be divided into two disjoint sets, U and V, such that every edge connects a vertex in U to a vertex in V. That is, U and V are independent sets. In the description herein U and V are N1 and N2.

2. Initialize MPR(x) to empty and initialize all nodes in $N2(x)$ as unmarked.

3. Find node $j \in N2(x)$ that is unmarked and has the least/lowest degree. The degree of a node is the number of edges incident to this node. The lower the degree of a two-hop neighbor (node), the greater the chance that it's one-hop neighbor will be selected into the MPR set. For example, if a two-hop node has a degree of one, this means that it has only one one-hop neighbor. This one-hop neighbor will definitely be selected into the MPR set. If a two-hop node has a degree of two, this means it has two one-hop neighbors. One of these one-hop neighbors needs to be selected into the MPR set. In the method of the present invention the one-hop neighbor that has the highest degree of unmarked nodes is selected thus covering the most nodes.

4. Find node set $\phi \subseteq N1(x)$, where nodes in $\phi$ are node j's neighbor. Find node $i \in \phi$ that has the maximum number of uncovered two-hop neighbor nodes.

5. Add node i to MPR(x), mark all the nodes in $N2(x)$ that are node i's neighbors.

6. Go to step 3 until all nodes in $N2(x)$ are marked.

Figure 2:
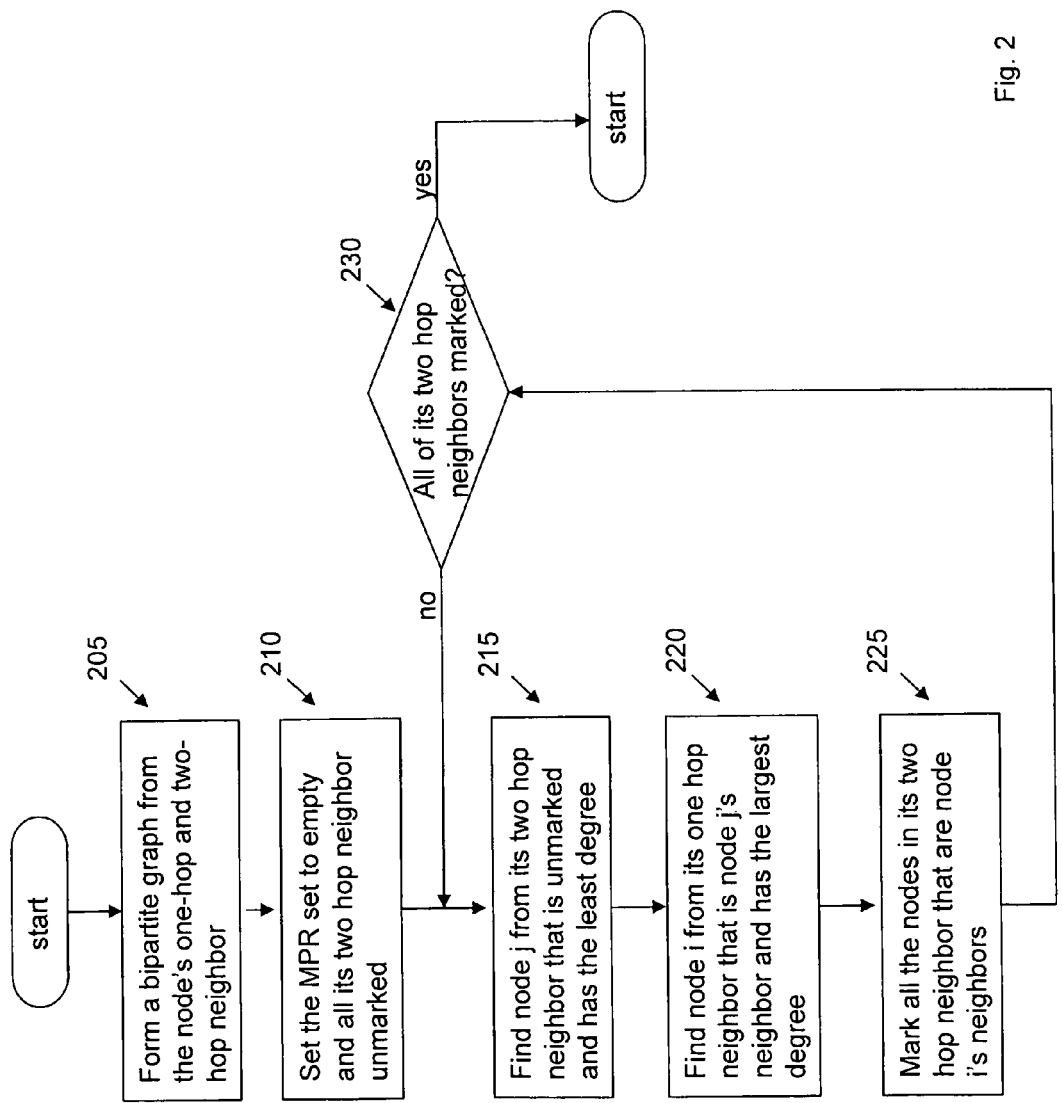
FIG. 2 is a flowchart of the heuristic minimum MPR selection algorithm.

FIG. 2 is a flowchart of the heuristic minimum MPR selection algorithm. At 205 a bipartite graph is formed from the node's one-hop and two-hop neighbors. At 210 the MPR set is initialized to empty and all elements in set N2 (two-hop neighbors) are unmarked (a list or table of the elements of N2 are initialized/cleared). At 215, a node j from set N2 is located with the lowest/least degree. At 220, node i from set N1 (one-hop neighbors) that is node j's neighbor and has the greatest/maximum degree is located/found. At 225, all the nodes in N2 are marked that are covered by node i (that are node i's neighbors). A test is performed at 230 to determine if all elements in N2 (all of the node's two-hop neighbors) are marked. If all of the elements of N2 are not marked, then processing proceeds to 215. If all of the elements of N2 are marked, then processing ends.

In a previously filed application PCT/US08/008162 filed Jun. 30, 2008, Applicants described using bit-mapped RTS/CTS signaling for multicast channel reservation in OBSSs. In this application, however, which nodes were included in the bitmap was not specified. Including all the AP's clients in the bitmap does not scale well. Randomly selecting a number of clients in the bitmaps, however, may cause some interfering APs could not receive the CTS message(s), collision maybe incurred at some stations when receiving multicast data. Herein and described next Applicants propose using the selected MPR set for multicast channel reservation using bit-mapped RTS/CTS signaling. The MPR set is selected by either the optimized method as described above and shown in FIG. 1 or by the heuristic method described above and shown in FIG. 2.

In the channel reservation method, each mobile station periodically scan its working channel, if there are APs other than the AP with which it is currently associated communicating over/working on this channel, the mobile station sends a beacon report to the AP with which it is associated. If a STA/node/client/mobile station finds no other APs (other than the AP with which the node is associated) when it performs a channel scan, then it is unnecessary to send a beacon message to its associated AP. The AP also periodically scans the channel itself, so it knows/finds/determines/locates the APs that are within its interference range. The APs in the interference range/area are called one-hop APs (one-hop neighbor AP) for the current AP. On the other hand, an AP that is on the list of a beacon report from a client/node/station (STA) but is not the AP itself or one of its one-hop APs is called a two-hop AP two-hop neighbor AP). A station that has sent a beacon report to the AP is called a one-hop STA. Note that the AP does not have to keep status of its associated stations that have not sent a beacon report. Over time, the AP would develop full knowledge of its one-hop STAs and two-hop APs. The AP would then form a bipartite graph using its one-hop STAs as its one hop neighbors, and two-hop APs as its two hop neighbors. If a two-hop AP is in the beacon report of a one-hop STA, there is an edge connecting this two-hop AP and the one-hop STA. Note that one-hop APs are not included in the formation of the bipartite graph. The AP can now determine its minimum MPR set using the optimized or heuristic methods described above. For multicast channel reservation, the AP broadcasts a RTS message using a bitmap control and partial virtual bitmap to specify the order that the nodes receiving the RTS message should send/transmit a CTS reply. Only MPR nodes are included in the bitmap. This increases the scalability of the bitmap approach.

Figure 3:
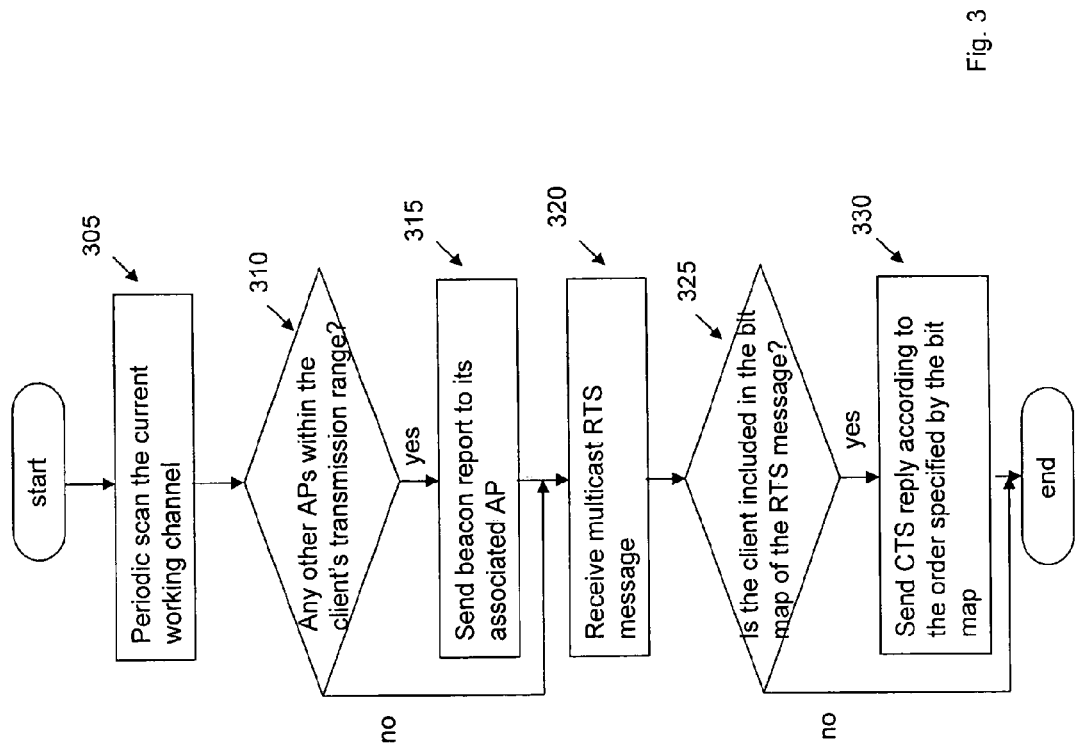
FIG. 3 is a flowchart using the MPR set for multicast channel reservation at the client side.

FIG. 3 is a flowchart using the MPR set for multicast channel reservation at the client side. At 305 the client/node/STA periodically scans its current working channel. A test is performed at 310 to determine if the client/node/STA locates any other APs (for example, by overhearing transmissions to/from the other AP) in its transmission range (other than the AP with which the client/node/STA is associated). If the client/node/STA locates any other APs in its transmission range then the client/node/STA sends/transmits a beacon message to it associated AP at 315. If the client/node/STA does not locate any other APs in its transmission range, then processing proceeds to 320, where the client/node/STA receives a multicast RTS message/signal. A test is performed at 325 to determine if the client/node/STA is included in the bitmap control and partial virtual bitmap of the RTS message. If the client/node/STA is included in the bitmap control and partial virtual bitmap of the RTS message, then the client sends/transmits a CTS reply message/signal according to the order specified in the bitmap control and partial virtual bitmap.

Figure 4:
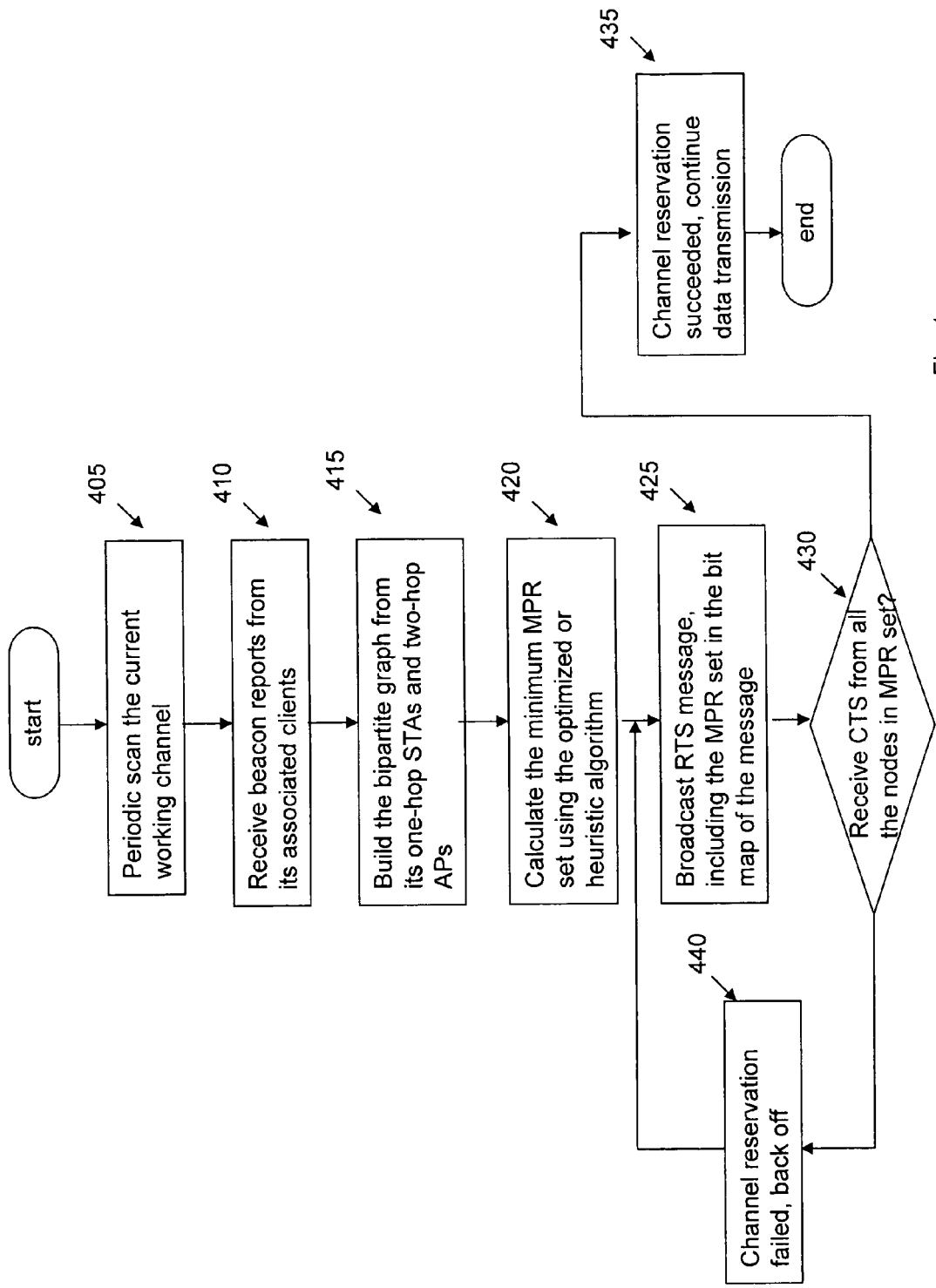
FIG. 4 is a flowchart using the MPR set for multicast channel reservation at the server side.

FIG. 4 is a flowchart using the MPR set for multicast channel reservation at the server side. At 405 the AP (server) periodically scans its current working channel. At 410 the AP receives beacon reports from its associated clients/nodes/STAs. At 415, the AP builds a bipartite graph using its one-hop STAs/nodes/clients and its two-hop APs. At 420 the AP determines the minimum MPR set using either the optimized MPR selection method or the heuristic MPR selection method. At 425 the AP multicasts a RTS message/signal using the selected MPR set in the bitmap control and partial virtual bitmap of the RTS message/signal. A test is performed at 430 to determine if CTS messages/signals have been received from all nodes in the selected MPR set (as specified in the bitmap control and partial virtual bitmap of the RTS message/signal). If CTS messages/signals have been received from all nodes in the selected MPR set (as specified in the bitmap control and partial virtual bitmap of the RTS message/signal), then the channel reservation was successful and data transmission can take place at 435. If CTS messages/signals have not been received from all nodes in the selected MPR set (as specified in the bitmap control and partial virtual bitmap of the RTS message/signal), then data transmission was not successful and at 440, it is necessary to back-off and processing proceeds to 425 to resend/retransmit the RTS message/signal.

Figure 5:
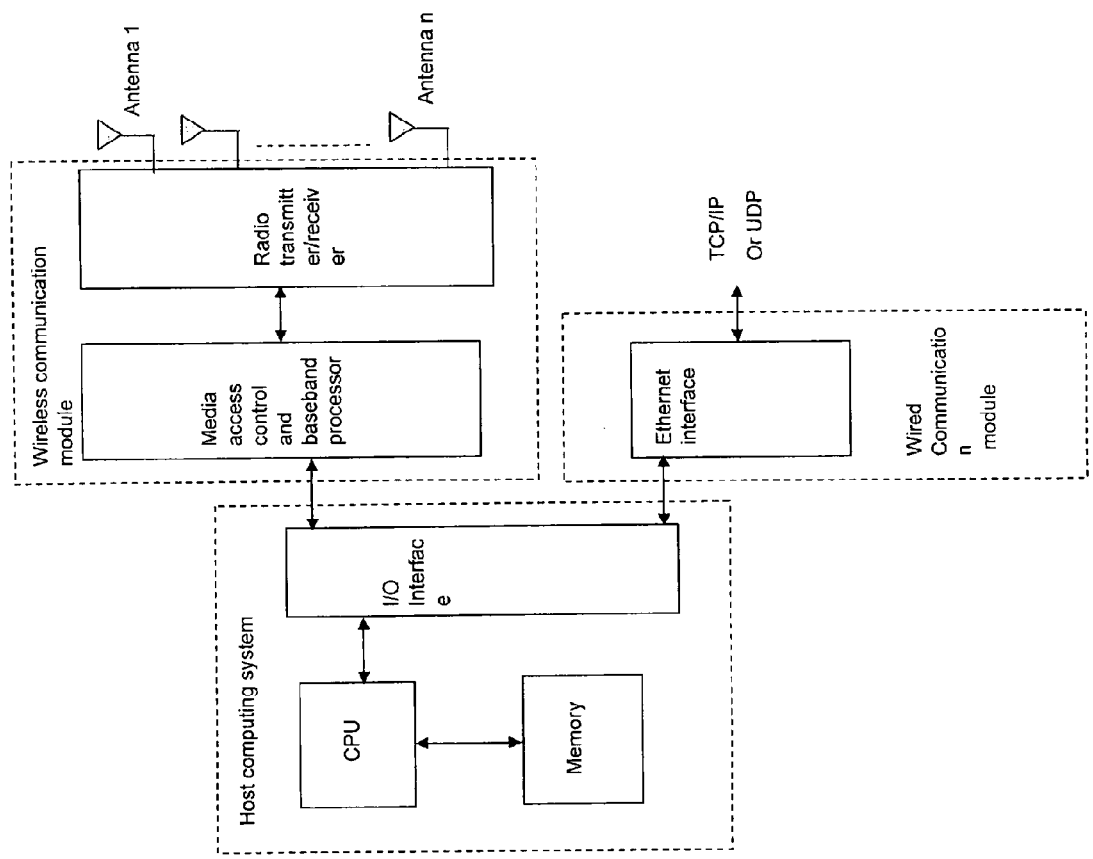
FIG. 5 is a block diagram of an exemplary implementation of the present invention for a STA/node and/or an AP.

FIG. 5 is a block diagram of an exemplary implementation of the present invention for a STA/node and/or an AP. As a STA and/or an AP can be a transmitter, a receiver or a transceiver, a single block diagram is used to describe these devices. Each device includes a host computing system, a wireless communication module and a wired communication module. The host processing system can be a general-purpose computer or a specific-purpose computing system. The host computing system can include a central processing unit (CPU), a memory and an input/output (I/O) interface. The wireless communication module can include a MAC and baseband processor, radio transmitter/receiver, and one or more antennas. An antenna transmits and receives the radio signals. The radio transmitter/receiver performs radio signal processing. The radio transmitter/receiver may be a transceiver or a separate transmitter and receiver. The MAC and baseband processor performs MAC control and data framing, modulation/demodulation, coding/decoding for the transmission/receiving. The wired communication module can be an Ethernet interface communicating with other devices using TCP/IP or UDP protocol.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
communicating with neighbor nodes in a wireless network;
first determining one-hop neighbor nodes and two-hop neighbor nodes responsive to said communication;
second determining a minimum multipoint relay set responsive to said first determination, wherein said second determination further comprises forming a matrix using said one-hop neighbor nodes and said two-hop neighbor nodes, forming an optimization problem responsive to said matrix, solving said optimization problem or forming a graph using said one-hop neighbor nodes and said two-hop neighbor nodes, initializing said minimum multipoint relay set, initializing a list of all elements of said two-hop neighbor nodes, third determining a node in a set of said two-hop neighbor nodes that has a lowest degree, fourth determining a node in a set of said one-hop neighbor nodes that is a neighbor of said node in said set of two-hop nodes and that has a greatest degree and marking all nodes in said set of two-hop neighbor nodes that are neighbors of said determined one-hop neighbor node; and communicating over said wireless network using said minimum multipoint relay set, wherein said communicating act further comprises receiving, by an access point, a beacon report from nodes associated with said access point, and wherein said access point is a special purpose node, fifth determining, by said access point, two-hop neighbor access points responsive to said received beacon report, multicasting, by said access point, a request-to-send message and receiving, by said access point, a clear-to-send message responsive to said request-to-send message, and wherein said request-to-send message includes a bitmap control and a partial virtual bitmap of nodes of said minimum multipoint relay set from which a response to said request-to-send message is requested.

2. The method according to claim 1, wherein said graph is a bipartite graph.

3. The method according to claim 1, wherein said clear-to-send message is received in an order specified in said bitmap control and said partial virtual bitmap.

4. The method according to claim 1, further comprising:
sixth determining if all nodes from which said response to said request-to-send message was requested have responded; and
transmitting data responsive to said sixth determination.

5. An apparatus, comprising:
means for communicating with neighbor nodes in a wireless network;
first means for determining one-hop neighbor nodes and two-hop neighbor nodes responsive to said communication;
second means for determining a minimum multipoint relay set responsive to said first determination, wherein said second means for determining further comprises forming a matrix using said one-hop neighbor nodes and said two-hop neighbor nodes, means for forming an optimization problem responsive to said matrix, means for solving said optimization problem or means for forming a graph using said one-hop neighbor nodes and said two-hop neighbor nodes, means for initializing said minimum multipoint relay set, measn for initializing a list of all elements of said two-hop neighbor nodes, third means for determining a node in a set of said two-hop neighbor nodes that has a lowest degree, fourth means for determining a node in a set of said one-hop neighbor nodes that is a neighbor of said node in said set of two-hop nodes and that has a greatest degree and marking all nodes in said set of two-hop neighbor nodes that are neighbors of said determined one-hop neighbor node; and means for communicating over said wireless network using said minimum multipoint relay setset, wherein said means for communicating further comprises means for receiving, by an access point, a beacon report from nodes associated with said access point, and wherein said access point is a special purpose node, fifth means for determining, by said access point, two-hop neighbor access points responsive to said received beacon report, measn for multicasting, by said access point, a request-to-send message and means for receiving, by said access point, a clear-to-send message responsive to said request-to-send message, and wherein said request-to-send message includes a bitmap control and a partial virtual bitmap of nodes of said minimum multipoint relay set from which a response to said request-to-send message is requested.

6. The apparatus according to claim 5, wherein said graph is a bipartite graph.

7. The apparatus according to claim 5, wherein said clear-to-send message is received in an order specified in said bitmap control and said partial virtual bitmap.

8. The apparatus according to claim 5, further comprising:
sixth means for determining if all nodes from which said response to said request-to-send message was requested have responded; and
means for transmitting data responsive to said sixth means for determining.

* * * * *